(12) United States Patent
Johnson

(10) Patent No.: US 6,760,725 B1
(45) Date of Patent: Jul. 6, 2004

(54) COMPUTER SYSTEM INCLUDING SOFTWARE FOR CONVERTING DATES AT THE TURN OF THE CENTURY

(75) Inventor: Jack D. Johnson, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 849 days.

(21) Appl. No.: 09/126,996

(22) Filed: Jul. 31, 1998

(51) Int. Cl.[7] .............................................. G06F 17/30
(52) U.S. Cl. .............................. 707/6; 368/28; 713/502
(58) Field of Search ........................ 707/6; 713/1, 400, 713/500, 501, 502; 710/260; 368/28, 29

(56) References Cited

U.S. PATENT DOCUMENTS

| | | | |
|---|---|---|---|
| 5,572,720 A | 11/1996 | Reed et al. ................ | 395/555 |
| 5,668,989 A | * 9/1997 | Mao .......................... | 707/101 |
| 5,765,145 A | * 6/1998 | Masiello .................... | 707/1 |
| 5,926,814 A | * 7/1999 | Fridman .................... | 707/6 |
| 5,974,569 A | * 10/1999 | Nickles ...................... | 714/38 |
| 6,044,371 A | * 3/2000 | Person et al. .............. | 707/6 |
| 6,064,817 A | * 5/2000 | Carter et al. .............. | 395/705 |
| 6,071,317 A | * 6/2000 | Nagel ....................... | 717/4 |

FOREIGN PATENT DOCUMENTS

| | | | |
|---|---|---|---|
| GB | 2312-060 A | 12/1997 | ......... G06F/11/00 |
| WO | WO 98/29809 A | 7/1998 | ......... G06F/11/00 |

OTHER PUBLICATIONS

The Winn L. Rosch Hardware Bible Third Edition, Brady Publishing, 1994, "The Basic Input/Output System," Chapter 7, pp. 382–393 and 418–450.
Year 2000.Com v2.32b, May 23, 1998 and http://www.rightime.com/pub/year2000.tx N.b. p. 3 from the website.
Circuit Cellar Ink, "Year 2000 and Embedded PC's", Scott Lehrbaum, Jan. 1998, pp. 44–46, 48.

* cited by examiner

Primary Examiner—Uyen Le

(57) ABSTRACT

A computer system includes a real time clock and a non-volatile memory that stores a current date and time from the real time clock. This date is proactively updated at the turn of the century by software running on the computer. This software looks for an Interrupt 08 signal and, in response, determines whether the current date stored in the non-volatile memory is equal to Dec. 31, 1999. If it is, the software determines whether the current time is a predetermined amount of time (e.g., one or two seconds) before the end of the day. If both these criteria are met, the current date in the non-volatile memory is set to Jan. 1, 2000 the current time is set to 00:00:00.

29 Claims, 2 Drawing Sheets

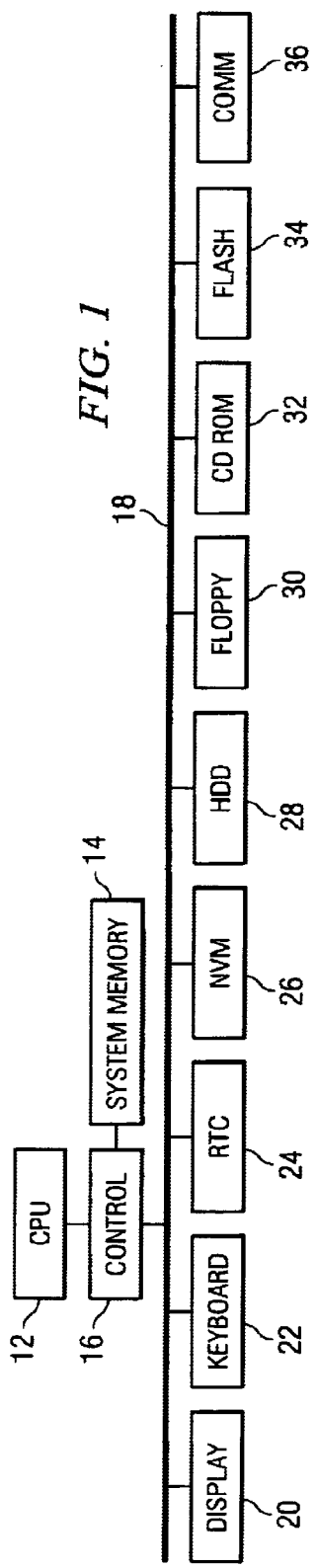
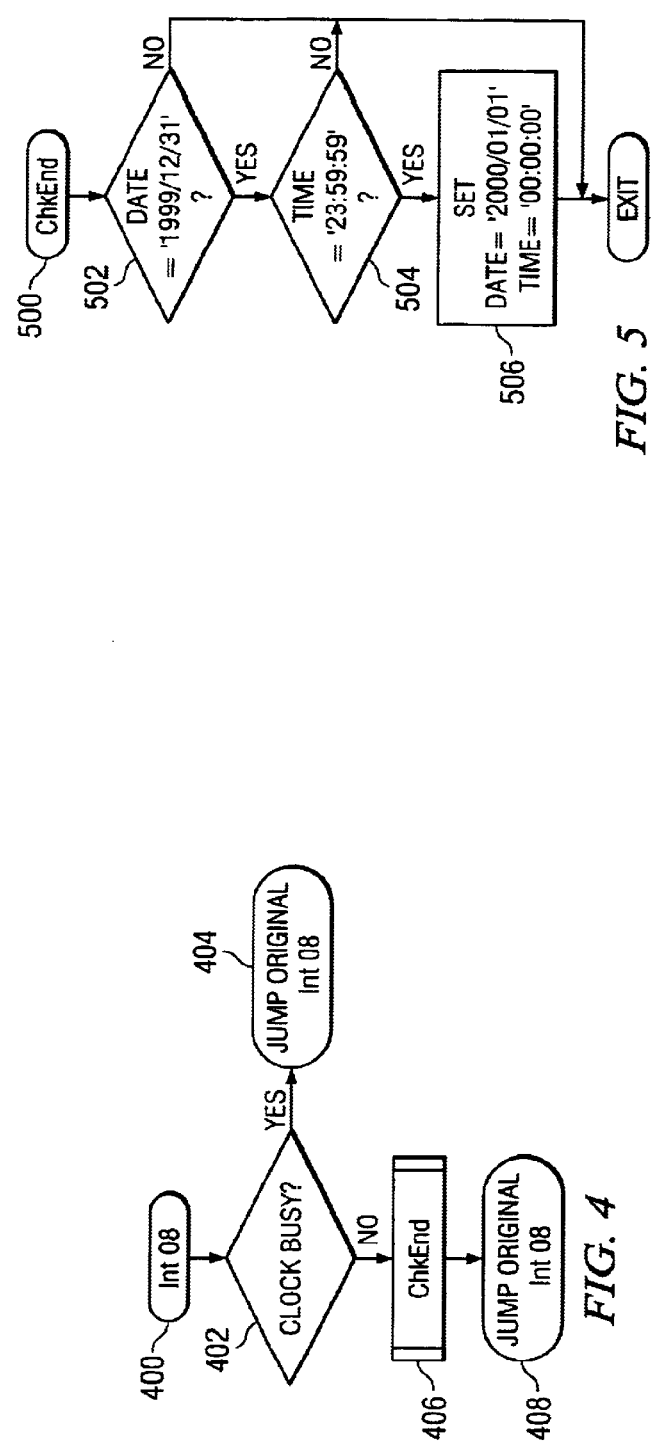

COMPUTER SYSTEM INCLUDING SOFTWARE FOR CONVERTING DATES AT THE TURN OF THE CENTURY

FIELD OF THE INVENTION

This invention relates generally to a computer system and specifically to a computer system that includes software for converting dates at the turn of the century.

BACKGROUND OF THE INVENTION

With the upcoming turn of the century, much has been discussed about how computers will react when the date turns from 1999 to 2000. The problem stems from the fact that many computers store the date in a two-digit format. In other words, the year 1998 would be stored simply as "98". The computer can then determine the year by adding 1900 to the stored year (e.g., 1900+98=1998). Of course this system will fail at the year 2000 since the only digits stored would be "00" and 1900+00=1900.

One particular instance where this problem exists is in a personal computer (PC) using the IBM AT or PS/2 standard. These systems utilize a real time clock (RTC) such as the Motorola MC146818 RTC which stores the date with three bytes (six nibbles) in packed BCD (binary coded decimal) format. The last two nibbles are used for the year. The MC146818 RTC also includes a non-volatile memory. By convention, two nibbles of this memory are reserved for the century. Since the RTC only stores the data and cannot manipulate this byte, the system must maintain the correct century.

One method for maintaining this date is suggested by the National Software Testing Laboratories in a white paper entitled "Year 2000 Compliance and the Industry Standard Personal Computer." This paper suggests an algorithm whereby any two-digit year less than 80 (since Microsoft DOS does not recognize any years before 1980) be interpreted as a corresponding date between 2000 and 2079. An algorithm is provided in the paper and repeated here.

Read date
If (year<80) {
  If (century<20) {
    century=20
    Read date
  }
}
Return date This algorithm will check if the year is less than 80. If so, the algorithm assures the date is between 2000 and 2079 and corrects it if it is not.

SUMMARY OF THE INVENTION

The present invention is provided to solve a number of deficiencies in the prior art. In one aspect, the present invention is a driver designed to fix the 1999–2000 century change problem. Unlike other Year 2000 (Y2K) fixes, this solution is proactive. The current date and time from the RTC is monitored at regular intervals and the 1999–2000 year change is made in the last one or two seconds of 1999.

In one embodiment, the present invention is a software driver stored within a memory in a computer system such as a personal computer or PC. The driver will monitor the current date and time at periodic intervals. At the periodic intervals, the driver will determine whether the date stored in the non-volatile memory is equal to a predetermined date. If it is, the driver will determine whether the time stored in the non-volatile memory is a predetermined amount of time before the end of the predetermined date. If both these date and time conditions are met, the non-volatile memory will be updated with the day after the predetermined date at the beginning of the day.

In one particular embodiment, the driver will recognize a timer interrupt (e.g., Interrupt 08) and, in response, determine whether the date is equal to Dec. 31, 1999. If it is, the driver will determine whether the time is a predetermined amount of time before the end of the day (e.g., equal to 23:59:58 or 23:59:59). If these date and time criteria are both met, the date and time will be set to Jan. 1, 2000 and setting the time to 00:00:00.

Unlike the prior art solution suggested by the National Software Testing Laboratories, this algorithm prevents 1900 from ever appearing as the RTC year. Fixes like that described in the Background react to the RTC clock year of 1900 and suffer from the latency between century roll-over and the software recognition. The RTC year is invalid during the latency period. In other words, immediately following the turn of the century, there will be some time in which the RTC believes the year is 1900. While this latency may be minimized, it cannot be not eliminated by looking for a "00" in the date field. Latency must be completely eliminated to fully support direct RTC port access.

With the present invention, the date will be correct regardless of how the clock is accessed. As is known, there are two ways that software can obtain the date from the RTC: via BIOS (e.g., Interrupt 1Ah) or by reading the RTC directly (e.g., via I/O ports 70$h$ and 71$h$). Prior art solutions such as the one proposed by NSTL will only work with the former. The present invention, on the other hand, will update the clock before it is ever accessed by software. This way, the clock will be correct regardless of the manner in which it is accessed.

BRIEF DESCRIPTION OF THE DRAWINGS

The above features of the present invention will be more clearly understood from consideration of the following descriptions in connection with accompanying drawings in which:

FIG. 1 is a block diagram of an exemplary computer system that could utilize the present invention; and FIGS. 2–5 are flow charts of the preferred embodiment algorithm.

DETAILED DESCRIPTION OF ILLUSTRATIVE EMBODIMENTS

Figure 2:
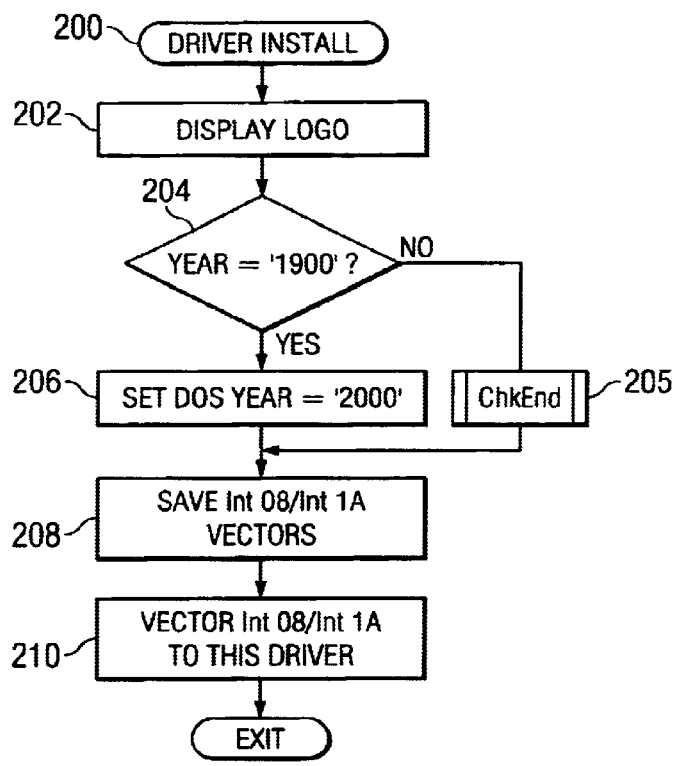

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

FIG. 1 illustrates a computer system 10 which can be used with the present invention. Computer system 10 includes a central processing unit (CPU) 12 which includes one or microprocessors. In the preferred embodiment, CPU 12 is an x86 processor such as the Pentium or Pentium II manufactured by Intel Corporation or equivalent processors manufactured, for example, by Advanced Micro Devices or National Semiconductor. Other non-Wintel processors could alternatively be used.

CPU 12 is coupled to system memory 14 which typically comprises dynamic random access memory. In this example, both CPU 12 and system memory 14 are coupled to control circuit 16. For the sake of simplicity, control circuit 16 is illustrated as a single block in FIG. 1. It is noted, however, that the control functions of circuit 16 may be distributed over a number of integrated circuit chips. The exact configuration of the circuit board is not critical in this invention.

CPU 12 is also coupled to at least one expansion bus 18. In keeping with the goal of simplicity, expansion bus 18 is illustrated as a single expansion bus even though it may in reality comprise more than one bus. For example, expansion bus 18 may comprise a PCI bus which is coupled to an EISA or ISA bus or a Universal Serial Bus (USB).

A number of devices are coupled to CPU 12 through expansion bus 18. These devices include display unit 20, which may include a graphics controller, video memory, and a display such as a monitor or LCD. Keyboard 22 may include a keyboard controller and a keyboard. These blocks 20 and 22 are intended to represent the interface to the user. Others devices in this category might include a pointing device such as a mouse or tracks ball, microphone, speakers, video camera or others.

Real time clock (RTC) 24 tracks the date and time, even when the power to the system is shut down. In one embodiment, RTC 24 is a Motorola MC146818 or equivalent. The MC146818 also includes a CMOS non-volatile memory (NVM) 26. Both RTC 24 and NVM 26 are powered by a separate battery (not shown) so that power will be maintained whether or not power is being supplied computer system 10 as a whole.

As discussed in the background, RTC 24 maintains the date with six nibbles—two for day, two for month and two for year. These six nibbles are stored in NVM 26 for access by CPU 12 whenever an application requires the current date. NVM 26 also stores the time as well as century information, e.g., in byte 32$h$ or byte 37$h$. This century information is not, however, manipulated by the real time clock 24. It is only stored for access by CPU 12 (or other hardware).

The present invention provides a software program that will periodically check the date stored in NVM 26 and proactively change the date prior to the century change so that the date will never be off by one hundred years. This software can be stored within the computer system 10 in one of two places—(1) a drive such as hard disk driver 28, floppy disk drive 30 or CD ROM (or DVD) 32 or (2) flash memory 34. In an alternate embodiment, this software is not stored in either of these places but rather loaded into system memory 14 through communications device 36 which may be a network interface card or a modem, as two examples.

In the preferred embodiment, the software is stored as a driver in one of the drives 28, 30, or 32, preferably hard drive 28. Alternatively, the software could be a TSR (terminate and stay resident) stored on a drive 28/30/32 or part of the BIOS (basis input output system) stored in flash memory 34. In any of these cases, the program will be loaded into system memory 14 for execution.

FIGS. 2–5 provide flow charts of the preferred embodiment computer program. A code listing is provided in Appendix A.

FIG. 2 illustrates a flowchart for the driver install program 200. In the first operation 202, a logo can be displayed. This operation is optional. Before saving the vectors, operation 204 will check if the current year is 1900. If it is, it will set the year to 2000 by operation 206. Alternatively, the program can check if the year is between "00" and "79." If any of those choices are found, the century can be set to "20."

If the current year is not 1900, operation 205 will call ChkEnd routine 500 to determine if it the last moments of 1999. ChkEnd routine 500 is illustrated in FIG. 5 and will be discussed in greater detail below.

Operation 208 saves vectors for Interrupt 08 (Int 08) and Interrupt 1A (Int 1A). Int 08 is the timer interrupt that sets a time pulse 18.2159 times per second, about every 55 ms. Int 1A is the time of day interrupt that allows a program application to retrieve the time of day from NVM 26. Both of these interrupts will be vectored to the driver being installed by operation 210. With this installation, any call to Interrupt 1A will first go to the program illustrated in FIG. 3 and any call to Interrupt 08 will first go to the program illustrated in FIG. 4.

In an alternate embodiment, when the date is set by operation 206 the install code may skip operations 208 and 210. Since the date has already been set to 2000, there is no reason to continually check it (assuming the date was correct at the time of installation and will not later be reset to a date prior to 2000). The software should also be installed if it includes provisions to check for later century changes (e.g., from 2099 to 2100).

Figure 3:
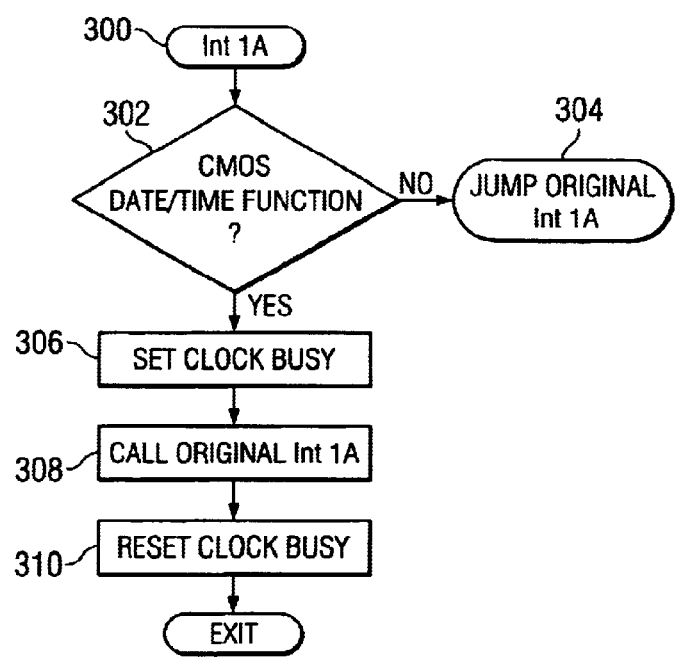

Referring now to FIG. 3, the software 300 for receipt of an Int 1A will be described. Upon receipt of Int 1A, operation 302 will determine whether a CMOS date/time function is being called. If not, the program will jump to the original Int 1A code per operation 304. The original Int 1A code is the code that would be called if this patch had not been installed.

If the Int 1A accesses a CMOS date/time function, operation 306 will set the clock as busy. Operation 308 will call the original Int 1A. Upon return, the busy clock will be reset by operation 310. This routine is included so that the routine of FIG. 4 will not disrupt another operation. The benefit of this operation will become clearer with reference to FIG. 4.

Software 400 of FIG. 4 will be executed whenever a Int 08 is set. With a standard PC, this will occur about 18 times each second. Alternatively, software 400 could be executed at other periodic intervals determined by some other method.

Operation 402 will check if the clock is busy. As discussed above, the clock will be busy whenever a software application has performed an Int 1A for a CMOS date/time function. So that routine 400 does not disturb the other software application, no further additional code will be executed when the clock is busy. In this case, operation 404 will jump to the original Int 08. As before, the original Int 08 code is the code that would be called if this patch had not been installed.

When the clock is not busy, operation 406 will cause the subroutine ChkEnd 500 to be executed. As illustrated in FIG. 5, this routine 500 will check the date to see if it is equal to Dec. 31, 1999 ('1999/12/31'). This is accomplished by operation 502. If not, subroutine 500 will return to Int 08 routine 400 and operation 408 will jump to the original Int 08. If the date is equal to Dec. 31, 1999, operation 504 will determine whether the time is equal to 23:59:59. In other words, the code will determine if it is one second before the turn of the century. If it is, the date and time will be reset to midnight on Jan. 1, 2000 by operation 506. At this point, the date has been updated without ever having been wrong. The time has only been adjusted by a fraction of a second.

Algorithm 400 assumes that the clock will not be busy for 18 consecutive calls from Int 08 during the one second that the date/time reads Dec. 31, 1999 at 11:59:59pm. If there is a chance that this assumption may be invalid, operation 410 may check if the time is 11:59:58 or 11:59:59 or even earlier. The earlier the program checks the time, the smaller the chance that the clock will be busy but the more time that may be adjusted by the change.

Alternatively, the algorithm can delay the roll over by a selected number of 55 ms increments, for example cause the roll over to occur at 23:59:59.5. This technique would be accomplished by setting a counter upon realizing the clock to reached 23:59:59. After the counter is set, a predetermined number of Int 08 timer interrupts can be counted before changing the clock. The risk in this routine is that the clock will be busy. The advantage is that the clock will have some time at 23:59:59 in case an application is scheduled to perform some task at that time.

As discussed above, this algorithm can be modified to periodically check for other century changes such as the change from 2099 to 2100. One of ordinary skill in the art will be able to modify the code provided herein to incorporate these changes.

The algorithm of the present could also be used to determine other dates. For example, some systems may not be able to recognize leap years after the turn of the century. In this case, the program could be set to look for February 28 for a leap year (e.g., 2000, 2004, 2008, etc.). The program would then set the system date to the next day (i.e., February 29) of that year. Other dates and/or times could also be checked for.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

APPENDIX

```
LF          equ     0ah                         ; ASCII line feed.
CR          equ     0dh                         ; ASCII carriage
                                                  return.
INT08Vector equ     word ptr es: [8*4]          ; Vector address.
INT1aVector equ     word ptr es: [1ah*4]        ; Vector address.
;           Request header format
RHSize      equ     byte ptr es: [bx][00]       ; Size of request
                                                  header.
RHUnits     equ     byte ptr es: [bx][01]       ; Number of units.
RHFunction  equ     byte ptr es: [bx][02]       ; Function code.
RHStatus    equ     word ptr es: [bx][03]       ; Completion status.
RHBrkO      equ     word ptr es: [bx][14]       ; Available address
RHBrkS      equ     word ptr es: [bx][16]       ;   for next driver.
code        segment PARA PUBLIC 'CODE'
            assume  cs:code,ds:code,es:code,ss:code
            org     0
            dd      0ffffffffh                  ; Driver chain.
            dw      8000h                       ; Driver attribute.
            dw      offset Strategy             ; Driver
            dw      offset Interrupt            ;   entries.
            db      'CPQRTC$$'                  ; Driver name.
HdrPointer  label   dword                       ; Request
HdrOffset   dw      0                           ;   header
HdrSegment  dw      0                           ;   pointer.
Int08Pointer label  dword                       ; INT08
Int08Offset dw      0                           ;   original
Int08Segment dw     0                           ;   vector.
Int1aPointer label  dword                       ; INT1A
Int1aOffset dw      0                           ;   original
Int1aSegment dw     0                           ;   vector.
```

APPENDIX-continued

```
ClkBsy                  db                      ; CMOS clock busy
                                                  flag.
ClkYear     db      0                           ; Clock
            db      0                           ;   year.
;           Handle driver strategy
Strategy:   mov     cs:HdrOffset,bx             ; Record request
            mov     cs:HdrSegment,es            ;   header pointer.
            retf                                ; Exit.
;           Handle driver interrupt
Interrupt:  les     bx,cs:HdrPointer            ; Init
            cmp     RHFunction,0                ;   function?
            jne     Interrupt_1                 ; No,error!
            jmp     InstallDriver               ; Yes.
Interrupt_1: mov    RHStatus,8103h              ; Invalid function!
            retf                                ; Exit.
;           INT08 interrupt service routine
Int08:      cmp     cs:ClkBsy,1                 ; CMOS clock busy?
            je      Int08_1                     ; Yes,exit.
            call    chkEnd                      ; Check end of
                                                  century.
Int08_1:    jmp     cs:Int08Pointer             ; Pass on interrupt.
;           Check for end of century
ChkEnd:     push    ax                          ; Save
            push    cx                          ;   entry
            push    dx                          ;   registers.
            pushf                               ; Insure no
            cli                                 ;   interruption,
            mov     ah,4                        ; Get the
            int     1ah                         ;   clock date.
            cmp     cx,1999h                    ; Last
            jne     ChkEnd_1                    ;   day
            cmp     dh,12h                      ;   of
            jne     ChkEnd_1                    ;     the
            cmp     dl,31h                      ;     century?
            jne     ChkEnd_1                    ; No,exit.
            mov     ah,2                        ; Get the
            int     1ah                         ;   clock time.
            cmp     ch,23h                      ; Last
            jne     ChkEnd_1                    ;   second
            cmp     cl,59h                      ;   of
            jne     ChkEnd_1                    ;     the
            cmp     dh,59h                      ;     century?
            jb      ChkEnd_1                    ; No,exit.
            mov     cx,0                        ; Set
            mov     dh,0                        ;   new
            mov     ah,3                        ;   clock
            int     1ah                         ;     time.
            mov     cx,2000h                    ; Set
            mov     dx,0101h                    ;   new
            mov     ah,5                        ;   clock
            int     1ah                         ;     date.
ChkEnd_1:   popf                                ; Restore interrupt
                                                  state.
            pop     dx                          ; Restore
            pop     cx                          ;   entry
            pop     ax                          ;   registers.
            ret                                 ; Exit.
;           Int1A interrupt service routine
Int1A:      cmp     ah,2                        ; CMOS
            jb      Int1A_1                     ;   clock
            cmp     ah,5                        ;   function?
            ja      Int1A_1                     ; No.
            mov     cs:ClkBsy,1                 ; Set CMOS clock
                                                  busy.
            pushf                               ; Pass on
            call    cs:Int1APointer             ;   interrupt.
            mov     cs:ClkBsy,0                 ; Clear CMSO clock
                                                  busy.
            iret                                ; Exit.
Int1A_1:    jmp     cs:Int1aPointer             ; Pass on interrupt.
Next        label   byte                        ; Next available
                                                  address.
InstallDriver: mov  ax,cs                       ; Local
            mov     ds,ax                       ;   segment.
            mov     ah,9                        ; Display
            mov     dx,offset CPQLogo           ;   driver
            int     21h                         ;   logo.
            mov     ah,4                        ; Get the
            int     1ah                         ;   clock date.
```

APPENDIX-continued

```
                cmp     cx,1900h            ; Century error?
                jne     InstallDrvr1        ; No.
                mov     al,dh               ; Convert
                call    Bcd2Bin             ;   month
                mov     dh,al               ;   and
                mov     al,dl               ;   day
                call    Bcd2Bin             ;   to
                mov     dl,al               ;     binary.
                mov     cx,2000             ; Set DOS
                mov     ah,2bh              ;   and BIOS
                int     21h                 ;   new century.
                jmp     InstallDrvr2        ; Continue,
InstallDrvr1:   call    ChkEnd              ; Check end of
                                              century.
InstallDrvr2:   mov     ax,0                ; Point to
                mov     es,ax               ;   INT vectors.
                pushf                       ; Disable
                cli                         ;   interrupts.
                mov     ax,Int08Vector      ; Save
                mov     Int08Offset,ax      ;   original
                mov     ax,                 ;   INT08
                        Int08Vector+2
                mov     Int08Segment,ax     ;     vector.
                mov     Int08Vector,        ; Vector INT08
                        offset Int08
                mov     Int08Vector+2,cs    ;   to CPQRTC.
                mov     ax,Int1aVector      ; Save
                mov     Int1aOffset,ax      ;   original
                mov     ax,Int1aVector+2    ;   INT08
                mov     Int1aSegment,ax     ;     vector.
                mov     Int1aVector,        ; Vector INT1A
                        offset Int1A
                mov     Int1aVector+2,cs    ;   to CPQRTC.
                popf                        ; Restore interrupt
                                              state.
                les     bx,HdrPointer       ; Last
                mov     RHBrkO,offset Next  ;   memory
                mov     RHBrkS,cs           ;   address.
                mov     RHStatus,0100h      ; Completion status.
                retf                        ; Exit.
;               Convert packed BCD to binary
Bcd2Bin:        mov     ah,al               ; Convert
                shr     ah,1                ;   the
                shr     ah,1                ;     specified
                shr     ah,1                ;       packed
                shr     ah,1                ;         BCD
                and     al,0fh              ;           binary
                aad                         ;             value.
                ret                         ; Exit.
CPQLogo         db      CR,LF,'CPQRTC 07/23/98 v1.1 Installed.',
                        CR,LF,'$'
code            ends
                end
```

What is claimed is:

1. A computer system comprising:

at least one central processing unit (CPU);

a system memory coupled to the CPU;

a non-volatile memory coupled to the CPU, the non-volatile memory storing a current date and time;

a real time clock coupled to the non-volatile memory to provide the current date and time to the non-volatile memory;

a memory for storing computer software, the computer software including a plurality of instructions capable of performing the operations of:

monitoring the current date and time at periodic intervals;

determining whether the current date is equal to a predetermined date;

if the current date is equal to the predetermined date, determining whether the current time is a predetermined amount of time before the end of that predetermined date;

if the current date is equal to the predetermined date and the current time is a predetermined amount of time before the end of the predetermined date, setting the date to the day after the predetermined date and setting the time to 00:00:00.

2. The system of claim 1 wherein the operation of monitoring the current date and time at periodic intervals comprises monitoring the current date and time upon receipt of an Interrupt 08.

3. The system of claim 1 wherein the computer software further includes instructions for performing the operations of:

recognizing a time of day interrupt;

determining if the date time interrupt affects the date and time stored in the non-volatile memory;

if the date time interrupt affects the date and time stored in the non-volatile memory, setting a clock busy signal;

calling a time of day interrupt code; and upon return from the time of day interrupt code, resetting the clock busy signal.

4. The system of claim 1 wherein the non-volatile memory comprises a CMOS memory.

5. The system of claim 1 wherein the memory for storing computer software comprises a hard disk drive.

6. The system of claim 1 wherein the memory for storing computer software comprises a floppy disk drive.

7. The system of claim 1 wherein the memory for storing computer software comprises a ROM drive.

8. The system of claim 1 wherein the computer software comprises a driver.

9. The system of claim 1 wherein the predetermined amount of time is less than about five seconds.

10. The system of claim 9 wherein the predetermined amount of time is about one second.

11. The system of claim 1 wherein the predetermined date is Dec. 31, 1999.

12. The system of claim 1 wherein the predetermined date is February 28 of a leap year.

13. A computer system comprising:

at least one central processing unit (CPU);

a system memory coupled to the CPU;

a non-volatile memory coupled to the CPU, the non-volatile memory storing a current date and time;

a real time clock coupled to the non-volatile memory to provide the current date and time to the non-volatile memory;

a memory for storing computer software, the computer software including a plurality of instructions operable to performing the operations of:

recognizing a timer interrupt;

upon receipt of the timer interrupt, determining whether the current date is equal to Dec. 31, 1999;

if the current date is equal to Dec. 31, 1999, determining whether the time is a predetermined amount of time before midnight on Dec. 31, 1999;

if the current date is equal to Dec. 31, 1999 and the current time is a predetermined amount of time before midnight on Dec. 31, 1999, setting the date to Jan. 1, 2000 and setting the time to 00:00:00.

14. The system of claim 13 wherein the timer interrupt comprises an Interrupt 08.

15. The system of claim 13 computer software further includes a instructions for performing the operations of:

recognizing a time of day interrupt;

determining if the date time interrupt affects the date and time stored in the non-volatile memory;

if the date time interrupt affects the date and time stored in the non-volatile memory, setting a clock busy signal;

calling a time of day interrupt code; and upon return from the time of day interrupt code, resetting the clock busy signal.

16. The system of claim 13 wherein the non-volatile memory comprises a CMOS memory.

17. The system of claim 13 wherein the memory for storing computer software comprises a hard disk drive.

18. The system of claim 13 wherein the memory for storing computer software comprises a ROM drive.

19. The system of claim 13 wherein the predetermined amount is less than about two minutes.

20. A method for proactively updating the date in a computer system that includes a real time clock and a non-volatile memory that stores a date and time from the real time clock, the method comprising:

monitoring the current date and time at periodic intervals;

at the periodic intervals, determining whether the date stored in the non-volatile memory is equal to a predetermined date;

if the date is equal to the predetermined date, determining whether the time stored in the non-volatile memory is equal to a predetermined amount of time before the end of the predetermined date; and if the date is equal to the predetermined date and the time is equal to the predetermined amount of time before the end of the predetermined date, setting the date in the non-volatile memory to the day after the predetermined date and setting the time in the non-volatile memory to 00:00:00.

21. The method of claim 20 wherein the step of monitoring the current date and time at periodic intervals comprises recognizing an interrupt and checking the current date and time in response to the interrupt.

22. The method of claim 21 wherein the interrupt comprises Interrupt 08.

23. The method of claim 20 wherein the predetermined date is Dec. 31, 1999.

24. The method of claim 20 wherein the predetermined date is February 28 of a leap year.

25. The method of claim 20 wherein the predetermined amount of time is less than a bout two minutes.

26. The method of claim 25 wherein the operation of determining whether the time stored in the non-volatile memory is equal to a predetermined amount of time before the end of the predetermined date comprises determining whether the time stored in the non-volatile memory is equal to 23:59:58 or 23:59:59.

27. A method for proactively updating the date at the turn of the century in a computer system that includes a real time clock and a non-volatile memory that stores a date and time from the real time clock, the method comprising:

recognizing an Interrupt 08 signal;

in response to the Interrupt 08 signal, determining whether the date stored in the non-volatile memory is equal to Dec. 31, 1999;

if the date is equal to Dec. 31, 1999, determining whether the time stored in the non-volatile memory is equal to 23:59; and if the date is equal to Dec. 31, 1999 and the time is equal to 23:59, setting the date in the non-volatile memory to Jan. 1, 2000 and setting the time in the non-volatile memory to 00:00:00.

28. The method of claim 27 and further comprising:

recognizing an Interrupt 1A signal;

determining if the Interrupt 1A signal requires an access to a date and time stored in the non-volatile memory;

if the Interrupt 1A signal requires an access to the date and time stored in the non-volatile memory, setting a clock busy signal;

calling an Interrupt 1A program; and upon return from the Interrupt 1A program, resetting the clock busy signal.

29. The method of claim 27 wherein determining whether the time stored in the non-volatile memory is equal to 23:59 comprises determining whether the time stored in the non-volatile memory is equal to 23:59:59.

* * * * *